Nov. 17, 1964    H. STRAUB ETAL    3,157,260
ELECTROMAGNETIC POSITIVE DRIVE CLUTCH
Filed Oct. 20, 1961    2 Sheets-Sheet 1

Inventor:

by: Alberto Zalkind

United States Patent Office 3,157,260
Patented Nov. 17, 1964

3,157,260
ELECTROMAGNETIC POSITIVE DRIVE CLUTCH
Hermann Straub, Friedrichshafen, Anselm Blum, Gunzenhaus, Gemeinde Kehlen, and Franz Bialek, Friedrichshafen, Germany, assignors to Zahnradfabrik Friedrichshafen Aktiengesellschaft, Friedrichshafen am Bodensee, Germany
Filed Oct. 20, 1961, Ser. No. 146,571
6 Claims. (Cl. 192—84)

This invention relates to electromagnetic clutches and more particularly to a type of clutch which uses meshing teeth for positive drive.

Positive drive electromagnetic clutches have heretofore been known in the art. However, most of the prior art clutches are of the type which require the use of slip rings for the reason that the magnet body which carries the solenoid revolves with the driving or driven shaft. Such a clutch requires considerably more space than the type wherein the magnet body is stationary and no slip rings are used. Also, such clutches, where of the positive drive type having a ring of teeth meshing with another ring of teeth, generally require the rings to be rather large, encompassing the magnetic clutch body. This requires torque transmission to be via a flux guide plate generally composed of three integrally secured rings, the center ring being of non-magnetic material. Of course, such an arrangement imposes an additional stress on the guide plate, thus requiring it to be made of heavy material and the rings strongly bonded to each other.

It is an object of the invention to overcome the various disadvantages of prior art clutches as indicated above.

It is another object of the invention to provide a clutch capable of being built economically and using a minimum of space.

It is a still further object of the invention to provide a positive drive electromagnetic clutch wherein the stress on the various clutch parts, such as the guide ring, is at a minimum.

An additional object of the invention is to build a clutch having a stationary magnet body wherein the armature and the guide ring are so related to each other as to prevent twisting of the springs disposed therebetween, when the clutch is open, which springs effect disengagement of the clutch when the solenoid is de-energized.

Other objects and features of the invention will be apparent from the detailed description to follow.

Briefly, the invention comprises a magnet body of the usual form having a channel for accommodating a solenoid. The magnet body is maintained stationary and supported by means of a needle bearing on a hub keyed to a drive shaft. Co-acting with the solenoid is a flux guide plate, of the general type described above, which provides paths from the solenoid to the armature. A thrust bearing is utilized intermediate the guide plate and the magnet body in order to take the axial stress effected by that component of magnetic flux which is concentric with the clutch axis. However, in at least one form of the invention to be disclosed herein, the arrangement is such as to permit dispensing with the thrust bearing. The armature and the guide plate, while axially movable with respect to each other, are maintained apart by means of a series of angularly spaced springs in a generally novel arrangement. However the armature and guide plate are keyed to each other so that they rotate together, keying means being a series of angularly spaced bolts extending therebetween. The armature is carried on a driven collar in turn keyed to a driven shaft. The end face of the hub which carries the solenoid, and the end face of the driven collar which carries the armature are provided with teeth which may intermesh with each other when the armature is pulled by the solenoid. Thus, by providing the rings of intermeshing teeth centrally of the construction instead of generally outwardly, as in prior art constructions, a much more compact unit is achieved and at the same time the clash effect on the teeth is minimized inasmuch as they do not travel at the same linear rate as teeth disposed further from the shaft axis would, due to the greater radius involved.

A detailed description of the invention will now be given in conjunction with the appended drawing in which.

Figure 1:
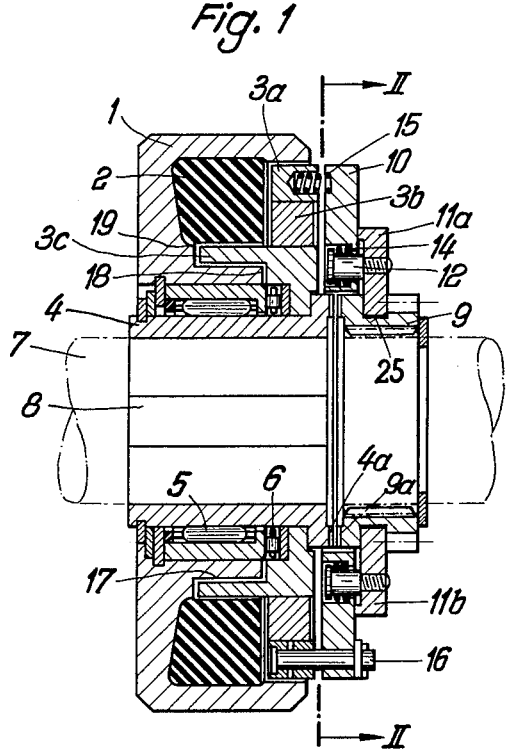
FIG. 1 is a longitudinal cross section of the clutch embodying the principles of the invention.
Figure 2:
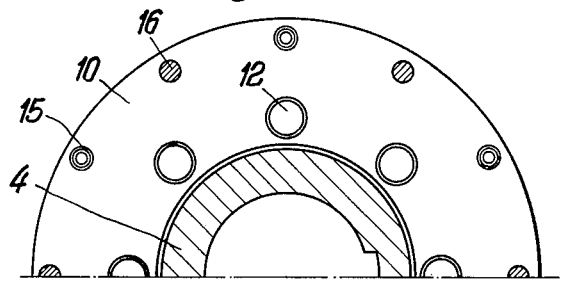
FIG. 2 is a section through II—II of FIG. 1.

Referring to FIGS. 1 and 2, the invention comprises a drive shaft 7 on which is keyed a drive sleeve or hub 4, as by a key 8, which hub is encompassed by a needle bearing 5 which supports a magnet body 1 within which is disposed the solenoid 2. The magnet body is maintained stationary by any suitable means well understood in the art, and appropriate electrical connections to the solenoid are made in a conventional manner. Encompassed within the outer confines of the magnet body is a flux guide plate comprised of three rings, 3a, 3b, and 3c, integrally secured to each other in any known manner, wherein the ring 3b is of non-magnetic material. The ring 3c is extended in a skirt concentrically into the magnet body within the annulus of the solenoid 2. A radial flange of ring 3c extends toward the hub 4 and intermediate such flange and the needle bearing is a thrust bearing 6 to take the stress occasioned by the axial component of the flux from the solenoid. It will be noted that a concentric air gap 17, intermediate the flange of ring 3c and the inner annulus of the magnet body 1, is smaller than the radial gaps 18 and 19 intermediate the same two elements. This is for the purpose of minimizing the axial flux component to thus relieve stress on the thrust bearing. In other words, the relative dimension of the air gaps tend to effect transition of the flux lines so that they are concentrated on the air gap 17 with a flow in a radial direction and create no axial component. An armature 10 is provided and a series of angularly spaced springs 15 are disposed intermediate the armature and the upper ring 3a, having their ends socketed in these elements as shown. The springs provide for movement of the armature away from the guide plate when the solenoid is de-energized. The armature engages in a series of bolts 12 screwed into respective halves 11a and 11b of a split collar, which halves will be understood to engage in a ring groove 25 cut in a driven sleeve or hub 9 which in turn is keyed to the driven shaft as shown. Carried on the bolts 12 are respective springs 14 which serve to press the armature against the split collar elements. Thus, the springs 14 assist in the break-away of the armature when the clutch is de-energized.

A series of bolts 16 extending intermediate the armature and the guide plate maintain these two elements integrally locked for rotation, but axially movable with respect to each other due to the slidable relationship of the bolts with the armature. The bolts 16 may be permanently fastened in the outer guide plate ring 3a.

The facing edges of the sleeves 4 and 9 are provided with respective rings of teeth 4a and 9a which can intermesh when the solenoid is energized by pulling armature 10 toward the left, in a well understood manner.

The purpose of the bolts 16 and the providing for no relative rotation between armature 10 and the guide plate 3a–c is to prevent bending or twisting of the springs 15 when the clutch is open. The armature is free to rotate with respect to the now stationary driven collar 9, via the split collar 11a and 11b.

Preferably the inner guide-plate ring 3c is pressed on to the hub 4, so that the guide-plate 3a, 3b, 3c, the armature 10 and the split-ring 11a, 11b constantly rotate with the input shaft 7.

It will, of course, be understood that the driven hub 9 may be slidably splined to the driven shaft or, alternatively, suitable provision made for some axial movement of the driven shaft, in the event that hub 9 is immovably fixed thereto, so that there will be enough play to permit engagement of the teeth rings 4a and 9a.

The effect of the springs 14 to effect break-away of the armature when the clutch is de-energized does not reduce the contact power between the hubs 4 and 9 and, therefore, does not reduce the transferable momentum of the clutch.

Figure 3:
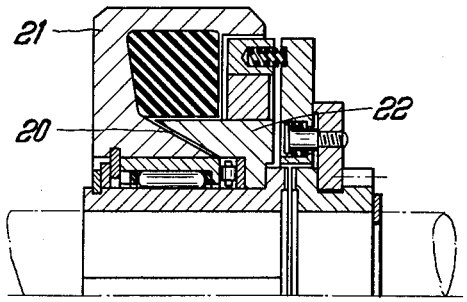
FIG. 3 is a longitudinal cross section of half of a modified form of the invention.

Referring now to the form of the invention shown in FIG. 3, all elements are essentially the same except that the gap 20 intermediate the magnet body 21 and the guide ring is of conical formation, being thus slanted in cross section as shown. Such arrangement minimizes the axial components of the magnetic flux in passing through the gap 20.

Figure 4:
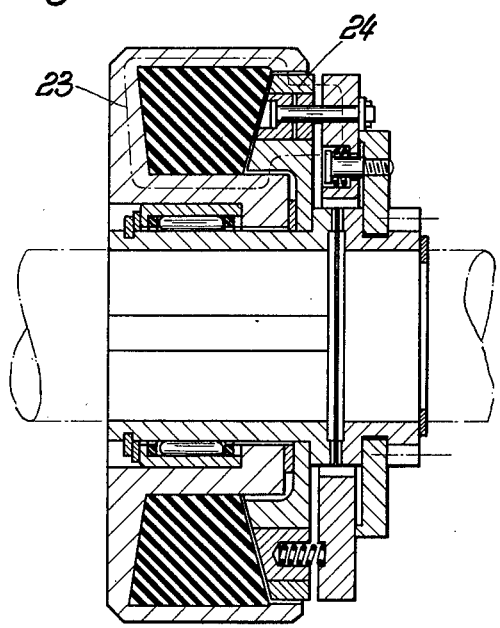
FIG. 4 is a longitudinal cross section of a still further modification of the invention.

In the form of the invention shown in FIG. 4, the arrangement of the magnet body 23 and the guide disk 24 is such that the flux lines from one to the other take place only in a radial direction as shown by the dot-dash loop surrounding the solenoid. This construction contemplates the provision of an inwardly slanting face for the solenoid and a complementarily, outwardly slanting face for the guide disk. Thus, the surface for the solenoid and the surface of the guide disk comprise, respectively, female and male conical surfaces in close juxtaposition to each other, as shown. By virtue of such construction no thrust bearing, such as the thrust bearing 6 of FIG. 1 is needed.

Having thus described our invention, we are aware that various changes may be made without departing from the spirit thereof, and, accordingly, we do not seek to be limited to the precise illustration herein given except as set forth in the appended claims.

We claim:

1. An electromagnetic clutch comprising a stationary magnet body having rotative bearing support on a hub, said hub being keyed to a rotary shaft and having an end face provided with a set of radial clutch teeth, an additional hub slidably splined to a second shaft and having an end face provided with a set of radial clutch teeth for meshing with the teeth of said first mentioned set, an armature carried by said second mentioned hub and relatively rotative thereto, a flux guide means comprising a pair of spaced integrally secured concentric magnetic rings secured to said armature for rotation therewith, said magnet body having a solenoid and said flux guide means being disposed intermediate said solenoid and said armature, said armature being slidably keyed to said flux guide means.

2. An electromagnetic clutch as set forth in claim 1, said second mentioned hub having a peripheral groove and means for securing said armature to said second mentioned hub comprising a pair of half rings secured to said armature and fitting into said peripheral groove.

3. In an electromagnetic clutch as set forth in claim 1, said armature being axially spaced from said flux guide means and resilient elements intermediate said armature and said flux guide means to effect said spacing.

4. In an electromagnetic clutch as set forth in claim 1, said second mentioned hub having a peripheral groove and means for securing said armature to said second mentioned hub comprising a pair of half rings secured to said armature and fitting into said peripheral groove, and means for securing said half rings to said armature comprising bolts extending therebetween and resilient means biasing said armature toward said half rings.

5. In an electromagnetic clutch as set forth in claim 1, including a bearing race intermediate said magnet body and said first mentioned hub and thrust bearings intermediate said flux guide means and said bearing race.

6. In an electromagnetic clutch as set forth in claim 1, the innermost of the magnet rings forming said flux guide means being extended axially so as to protrude into said magnet body and being disposed inwardly of said solenoid and between the inner periphery of said solenoid and the magnet body.

References Cited in the file of this patent

UNITED STATES PATENTS

| 918,254 | Ast | Apr. 13, 1909 |
| 2,039,714 | Fuller | May 5, 1936 |
| 2,055,723 | Hope | Sept. 29, 1936 |
| 2,722,846 | McDonald | Nov. 8, 1955 |
| 2,853,291 | Adam | Sept. 23, 1958 |
| 2,936,053 | Reucker | May 10, 1960 |
| 2,962,142 | Straub | Nov. 29, 1960 |
| 2,966,975 | Weidmann et al. | Jan. 3, 1961 |
| 3,036,680 | Jaeschke | May 29, 1962 |

FOREIGN PATENTS

| 569,931 | Belgium | Aug. 14, 1958 |